US007233683B2

(12) United States Patent
Han et al.

(10) Patent No.: US 7,233,683 B2
(45) Date of Patent: Jun. 19, 2007

(54) METHOD AND SYSTEM FOR GUIDING A VEHICLE WITH VISION-BASED ADJUSTMENT

(75) Inventors: Shufeng Han, Johnston, IA (US); John Franklin Reid, Moline, IL (US); Terence Daniel Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 89 days.

(21) Appl. No.: 11/107,114

(22) Filed: Apr. 15, 2005

(65) Prior Publication Data
US 2006/0147089 A1 Jul. 6, 2006

Related U.S. Application Data

(60) Provisional application No. 60/641,240, filed on Jan. 4, 2005.

(51) Int. Cl.
*G06K 9/00* (2006.01)
(52) U.S. Cl. .................. 382/104; 340/995.25; 701/28
(58) Field of Classification Search ............... 340/988, 340/995.25; 701/23, 28
See application file for complete search history.

(56) References Cited

U.S. PATENT DOCUMENTS

| 5,684,476 | A | 11/1997 | Anderson ................... 340/988 |
| 5,955,973 | A | 9/1999 | Anderson ................... 340/988 |
| 5,974,348 | A | * 10/1999 | Rocks .......................... 701/28 |
| 6,385,515 | B1 | 5/2002 | Dickson et al. ............... 701/28 |
| 6,445,983 | B1 | 9/2002 | Dickson et al. ............... 701/23 |
| 6,697,724 | B2 | 2/2004 | Beck ........................... 701/50 |
| 6,760,654 | B2 | 7/2004 | Beck ........................... 701/50 |
| 6,946,978 | B2 * | 9/2005 | Schofield ............... 340/995.28 |
| 2002/0105428 | A1 | 8/2002 | Benson et al. ............. 340/635 |
| 2002/0106108 | A1 | 8/2002 | Benson et al. ............. 382/104 |

OTHER PUBLICATIONS

Foessel-Bunting A, Bares J, and Whittaker W. Three-Dimensional Map Building With MMW Radar [online], [retrieved on Apr. 15, 2005]. Retrieved from the Internet:<URL:www.ri.cmu.edu/pubs/pub_3758.text.html>.

Welch G and Bishop G. Scaat: Incremental Tracking with Incomplete Information. International Conference on Computer Graphics and Interactive Techniques [online], Aug. 1997 [retrieved on Apr. 15, 2005]. Retrieved from the Internet: <URL:www.cs.unc.edu/~welch/publications.html>.

(Continued)

*Primary Examiner*—Bhavesh M Mehta
*Assistant Examiner*—Christopher Lavin

(57) ABSTRACT

A method and system for guiding a vehicle comprises a location module (e.g., location-determining receiver) for collecting preliminary location data for the vehicle. A vision module collects vision-derived location data for the vehicle during an evaluation time window. A location quality estimator estimates location quality data for the corresponding collected preliminary location data during an evaluation time window. A vision module estimates vision quality data for the corresponding collected vision-derived location data during the evaluation time window. A adjuster adjusts the preliminary location data to a revised location data based on the vision-derived location data such that the revised location data is registered with or generally coextensive with the vision-derived location data, if the vision quality data exceeds the minimum threshold level.

20 Claims, 4 Drawing Sheets

OTHER PUBLICATIONS

Roth S and Singh S. Application of Robust, High-Accuracy Positioning for Autonomous Ground Vehicles [online], Aug. 2004 [retrieved on Apr. 15, 2005]. Retrieved from the Internet:<URL:www.ri.cmu.edu/pubs/pub_4804_text.html>.

Wagner M, O'Hallaron D, Apostolopoulos D, and Urmson C. Principles of Computer System Design for Stereo Perception [online], Jan. 17, 2002 [retrieved on Apr. 15, 2005]. Retrieved from the Internet: <URL:frc.ri.cmu.edu/~mwagner/publications/18_980_final_report.pdf>.

Chatterji, G.B.; Menon, P.K.; and Sridhar, B. GPS/Machine Vision Navigation System for Aircraft. *IEEE Transactions on Aerospace and Electronic Systems*, vol. 33, No. 3 (Jul. 1997), pp. 1012-1025.

Guo, L.S.; Zhang, Q.; and Feng, L. *A Low-Cost Integrated Positioning System of GPS and Intertial Sensors for Autonomous Agricultural Vehicles*. ASAE Meeting Paper No. 033112 (Jul. 27-30, 2003).

Han, S.; Zhang, Q.; and Noh, H.K. *Applying Filtering Techniques to Improve GPS Positioning Accuracy*. ASAE Meeting Paper No. 01-1158 (Jul. 30-Aug. 1, 2001).

Noguchi, N.; Reid, J.F.; Will, J.; Benson, E.R.: and Stombaugh, T.S. *Vehicle Automation System Based on Multi-Sensor Integration*. ASAE Meeting Paper No. 983111 (1998).

You, S. and Neumann, U. Fusion of Vision and Gyro Tracking for Robust Augmented Reality Registration. *In Proc. IEEE Virtual Reality*, (2001) pp. 71-78.

\* cited by examiner

DGPS Static Positioning Error

DGPS by "Tuning" Positioning Error under US 7,233,683 B2

METHOD AND SYSTEM FOR GUIDING A VEHICLE WITH VISION-BASED ADJUSTMENT

This document claims priority based on U.S. provisional application Ser. No. 60/641,240, filed Jan. 4, 2005, and entitled VISION-AIDED SYSTEM AND METHOD FOR GUIDING A VEHICLE, under 35 U.S.C. 119(e).

FIELD OF THE INVENTION

This invention relates to a method and system for guiding a vehicle with vision adjustment.

BACKGROUND OF THE INVENTION

Global Positioning System (GPS) receivers have been used for providing position data for vehicular guidance applications. However, although certain GPS receivers with differential correction may have a general positioning error of approximately 10 centimeters (4 inches) during a majority of their operational time, an absolute positioning error of more than 50 centimeter (20 inches) is typical for five percent of their operational time. Further, GPS signals may be blocked by buildings, trees or other obstructions, which can make GPS-only navigation system unreliable in certain locations or environments. Accordingly, there is a need for supplementing or enhancing a GPS-based navigation system with one or more additional sensors to increase accuracy and robustness.

SUMMARY OF THE INVENTION

A method and system for guiding a vehicle comprises a location module (e.g., location-determining receiver) for collecting preliminary location data for the vehicle. A vision module collects vision-derived location data for the vehicle during an evaluation time window. A vision module estimates vision quality data for the corresponding collected vision-derived location data during the evaluation time window. A adjuster adjusts the preliminary location data to a revised location data based on the vision-derived location data such that the revised location data is registered with or generally coextensive with the vision-derived location data, if the vision quality data exceeds the minimum threshold level.

DESCRIPTION OF THE PREFERRED EMBODIMENT

Figure 1:
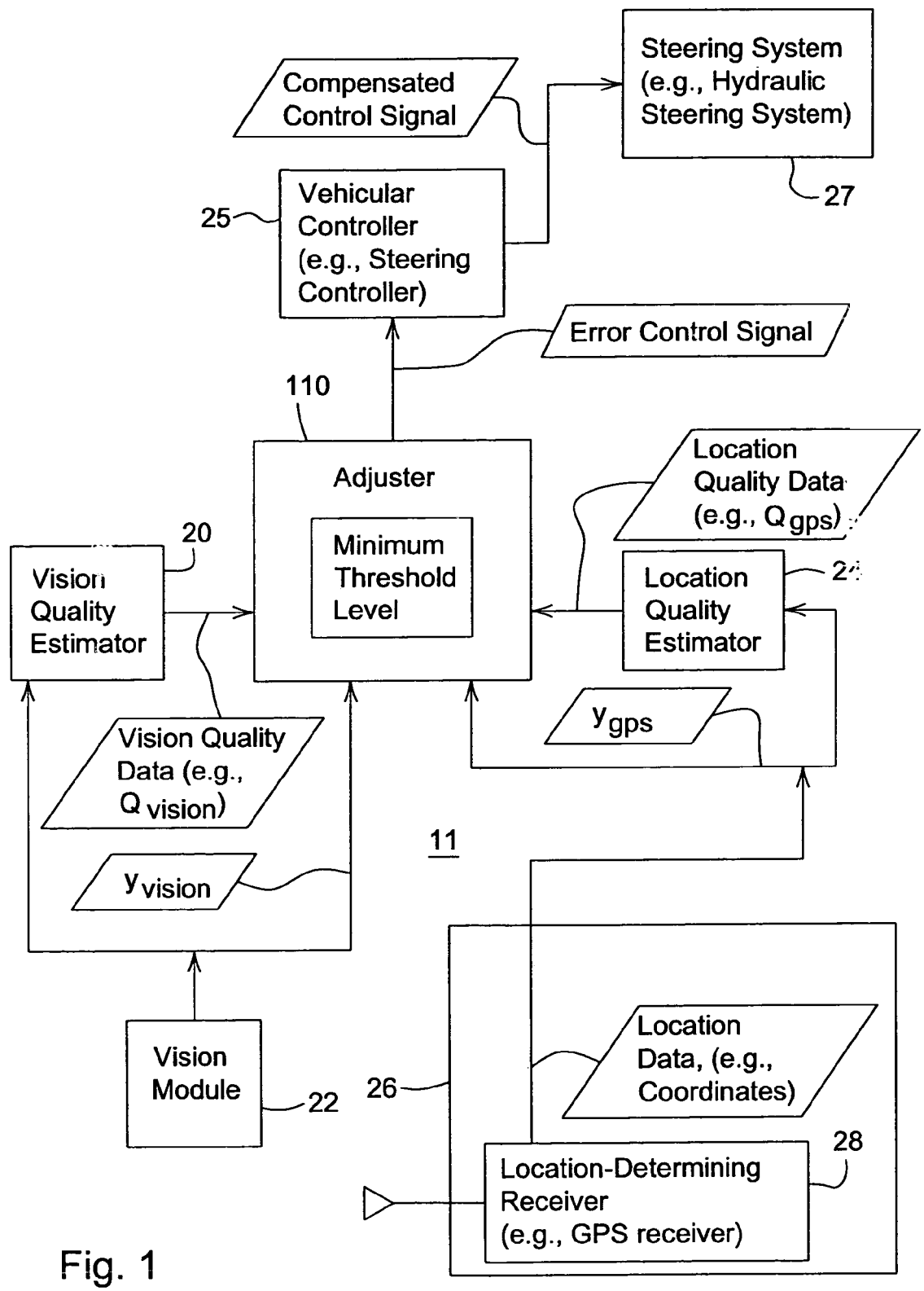
FIG. 1 is a block diagram of a system for guiding a vehicle based on preliminary location data and vision-derived location data in accordance with the invention.

FIG. 1 is a block diagram of a guidance system 11 for guiding a vehicle. The guidance system 11 may be mounted on or collocated with a vehicle or mobile robot. The guidance system 11 comprises a vision module 22 and a location-determining receiver 28 that communicates with an adjuster 110.

The vision module 22 may be associated with a vision quality estimator 20. The location-determining receiver 28 may be associated with a location quality estimator 24. The adjuster 110 may communicate with a vehicular controller 25. In turn, the vehicular controller 25 is coupled to a steering system 27.

The location-determining receiver 28 may comprise a Global Positioning System (GPS) receiver with differential correction (e.g., a GPS receiver and a receiver for receiving a differential correction signal transmitted by a satellite or terrestrial source). The location determining receiver 28 provides location data (e.g., coordinates) of a vehicle. The location-determining receiver 28 may indicate one or more of the following conditions or status (e.g., via a status signal) to at least the adjuster 110 or the location quality estimator 24: (1) where the location-determining receiver 28 is disabled, (2) where location data is not available or corrupt for one or more corresponding evaluation intervals, and (3) where the estimated accuracy or reliability of the location data falls below a minimum threshold for one or more evaluation intervals. The location-determining receiver 28 provides location data for a vehicle that is well-suited for global navigation or global path planning.

In one illustrative embodiment, the location-determining receiver 28 outputs location data in the following format:

$$y_{gps} = \begin{bmatrix} E_{off\_gps} \\ E_{head\_gps} \end{bmatrix},$$

where $E_{off\_gps}$ is the off-track error estimated by the location-determining receiver 28 (e.g., location-determining receiver 28), and $E_{head\_gps}$ is the heading error estimated by the location-determining receiver 28.

The vision module 22 may comprise an image collection system and an image processing system. The image collection system may comprise one or more of the following: (1) one or more monocular imaging systems for collecting a group of images (e.g., multiple images of the same scene with different focus settings or lens adjustments, or multiple images for different field of views (FOV)); (2) a stereo vision system (e.g., two digital imaging units separated by a known distance and orientation) for determining depth information or three-dimensional coordinates associated with points on an object in a scene; (3) a range finder (e.g., laser range finder) for determining range measurements or three-dimensional coordinates of points on an object in a scene; (4) a ladar system or laser radar system for detecting the speed, altitude, direction or range of an object in a scene; (5) a scanning laser system (e.g., a laser measurement system that transmits a pulse of light and estimates distance between the laser measurement system and the object based on the time of propagation between transmission of the pulse and reception of its reflection) for determining a distance to an object in a scene; and (6) an imaging system for collecting images via an optical micro-electromechanical system (MEMS), free-space optical MEMS, or an integrated optical MEMS. Free-space optical MEMS use compound semiconductors and materials with a range or refractive indexes to manipulate visible light, infra-red, or ultraviolet light, whereas integrated optical MEMS use polysilicon components to reflect, diffract, modulate or manipulate visible light, infra-red, or ultraviolet light. MEMS may be structured as switching matrixes, lens, mirrors and diffraction gratings that can be fabricated in accordance with various semiconductor fabrication techniques. The images collected by the image processing system may be in color, monochrome, black-and-white, or grey-scale images, for example.

The vision module 22 or vision-derived location data may support the collection of position data (in two or three dimensional coordinates) corresponding to the location of features of an object within the image. The vision module 22 is well suited for using (a) features or local features of an environment around a vehicle, (b) position data or coordinates associated with such features, or both to facilitate navigation of the vehicle. The local features may comprise one or more of the following: plant row location, fence location, building location, field-edge location, boundary location, boulder location, rock locations (e.g., greater than a minimum threshold size or volume), soil ridge and furrows, tree location, crop edge location, a cutting edge on vegetation (e.g., turf), and a reference marker. The vision-derived location data or position data of local features may be used to tune (e.g., correct for drift) the preliminary location data from the location-determining receiver 28 on a regular basis (e.g., periodically).

In one example, a reference marker may be associated with high precision location coordinates. Further, other local features may be related to the reference marker position. The current vehicle position may be related to the reference marker position or the fixed location of local features or the location of the vehicle. In one embodiment, the vision module 22 may express the vision-derived location data on the vehicle location in coordinates or a data format that is similar to or substantially equivalent to the coordinates or data format of the location-determining receiver 28.

The vision module 22 may indicate one or more of the following via a status or data message to at least the adjuster 110 or the vision quality estimator 20: (1) whether the vision module 22 is disabled, (2) whether vision-derived location data is not available during one or more evaluation intervals, (3) whether the vision-derived location data is unstable or corrupt, and (4) whether the image data is subject to an accuracy level, a performance level or a reliability level that does not meet a threshold performance/reliability level.

In one example, a vision module 22 is able to identify plant row location with an error as small as 1 centimeter for soybeans and 2.4 centimeter for corn.

In one illustrative example, the vision module 22 outputs vision-derived location data in the following format:

$$y_{vision} = \begin{bmatrix} E_{\text{off\_vision}} \\ E_{\text{head\_vision}} \end{bmatrix},$$

where $E_{\text{off\_vision}}$ is the off track error estimated by the vision module 22 and $E_{\text{head\_vision}}$ is the heading error estimated by the vision module 22.

The location quality estimator 24 may comprise one or more of the following devices: a signal strength indicator associated with the location-determining receiver 28, a bit error rate indicator associated with the location-determining receiver 28, another device for measuring signal quality, an error rate, signal strength, or performance of signals, channels, or codes transmitted for location-determination. Further, for satellite-based location-determination, the location quality estimator 24 may comprise a device for determining whether a minimum number of satellite signals (e.g., signals from four or more satellites on the L1 band for GPS) of a sufficient signal quality are received by the location-determining receiver 28 to provide reliable location data for a vehicle during an evaluation interval.

The location quality estimator 24 estimates the quality of the preliminary location data or location quality data (e.g., $Q_{gps}$) outputted by the location-determining receiver 28. The location quality estimator 24 may estimate the quality of the preliminary location data based on the signal strength indicator (or bit-error rate) of each signal component received by the location-determining receiver 28. The location quality estimator 24 may also base the quality estimate on any of the following factors: (1) the number of satellite signals that are available in an area, (2) the number of satellites that are acquired or received by the location-determining receiver with a sufficient signal quality (e.g., signal strength profile) and (3) whether each satellite signal has an acceptable signal level or an acceptable bit-error rate (BER) or frame-error rate (FER).

In one embodiment, different signal strength ranges are associated with different corresponding quality levels. For example, the lowest signal strength range is associated with the low quality, a medium signal strength range is associated with a fair quality, and highest signal strength range is associated with a highest quality. Conversely, the lowest bit-error rate range is associated with the highest quality, the medium bit error range is associated with the fair quality, and the highest bit error rate range is associated with the lowest quality level.

The vision quality estimator 20 estimates the quality of the vision-derived location data or vision quality data (e.g., $Q_{vision}$) outputted by the vision module 22. The vision quality estimator 20 may consider the illumination present during a series of time intervals in which the vision module 22 operates and acquires corresponding images. The vision quality estimator 20 may include a photo-detector, a photo-detector with a frequency selective lens, a group of photo-detectors with corresponding frequency selective lenses, a charge-coupled device (CCD), a photometer, cadmium-sulfide cell, or the like. Further, the vision quality estimator 30 comprises a clock or timer for time-stamping image collection times and corresponding illumination measurements (e.g., luminance values for images). If the illumination is within a low intensity range, the vision quality is low for the time interval; if the illumination is within a medium intensity range, the vision quality is high for the time interval; and if the illumination is within a high intensity range, the vision quality is fair, low or high for the time interval depending upon defined sub-ranges within the high intensity range. The foregoing intensity range versus quality may be applied on a light frequency by light frequency or light color basis, in one example. In another example, the intensity range versus quality may be applied for infra-red range frequencies and for ultraviolet range frequencies differently than for visible light.

The vision quality estimation may be related to a confidence measure in processing the images. If the desired features (e.g., plant rows) are apparent in one or more images, the vision quality estimator 20 may assign a high image quality or high confidence level for the corresponding images. Conversely, if the desired features are not apparent in one or more images (e.g., due to missing crop rows), the vision quality estimator 20 may assign a low image quality or a low confidence level. In one example, the confidence level is determined based on a sum of the absolute-differences (SAD) of the mean intensity of each column vector (e.g., velocity vector for the vision module 22) for the hypothesized yaw/pitch pair. Yaw may be defined as the orientation of the vision module 22 in an x-y plane and pitch may be defined as the orientation of the vision module 22 in the an x-z plane, which is generally perpendicular to the x-y plane.

If the vision module 22 is unable to locate or reference a reference feature or reference marker in an image or has not referenced a reference marker in an image for a threshold maximum time, the vision module 22 may alert the vision quality estimator 20, which may degrade the quality of the vision-derived location data by a quality degradation indicator.

In general, the adjuster 110 comprises a data processor, a microcontroller, a microprocessor, a digital signal processor, an embedded processor or any other programmable (e.g., field programmable) device programmed with software instructions. In one embodiment, the adjuster 110 comprises a rule manager. The rule manager of the adjuster 110 may apply the preliminary location data, or a derivative thereof, as the error control signal for a corresponding time interval, unless the vision quality data exceeds the minimum threshold level. No adjustment may be required unless the preliminary location data and the vision-derived location data differ by more than a maximum tolerance. The vision weight determines the extent that the contribution of the vision-derived location data (e.g., $y_{vision}$) from the vision module 22 governs. The location weight determines the extent that the contribution of location data from the location module 22 governs. The mixer 14 determines the relative contributions of location data (e.g., $y_{gps}$) and vision-derived location data (e.g., $y_{vision}$) to the error control signal (e.g., y) based on the both the vision weight and the location weight. In one embodiment, the mixer 14 may comprise a digital filter, a digital signal processor, or another data processor arranged to apply one or more of the following: (1) the vision-derived location data weight, (2) the location data weight, and (3) a mixing ratio expression of the relative contributions of the location data and the vision-derived location data for an evaluation time interval.

The error control signal represents a difference (or an error) between measured location data (measured by the vision module 22 and by location module) and the actual location of the vehicle. Such an error control signal is inputted to the vehicle controller 25 to derive a compensated control signal. The compensated control signal corrects the management and control of the steering system 27 based on the error control signal. The steering system 27 may comprise an electrical interface for communications with the vehicle controller 25. In one embodiment, the electrical interface comprises a solenoid-controlled hydraulic steering system or another electromechanical device for controlling hydraulic fluid.

In another embodiment, the steering system 27 comprises a steering system unit (SSU). The SSU may be associated with a heading versus time requirement to steer or direct the vehicle along a desired course or in conformance with a desired path plan. The heading is associated with a heading error (e.g., expressed as the difference between the actual heading angle an the desired heading angle).

The SSU may be controlled to compensate for errors in the estimated position of the vehicle by the vision module 22 or the location-determining receiver 28. For example, an off-track error indicates or is representative of the actual position of the vehicle (e.g., in GPS coordinates) versus the desired position of the vehicle (e.g., in GPS coordinates). The off-track error may be used to modify the movement of the vehicle with a compensated heading. However, if there is no off-track error at any point in time or a time interval, an uncompensated heading may suffice. The heading error is a difference between actual vehicle heading and estimated vehicle heading by the vision module 22 and the location-determining receiver 28.

Figure 2:
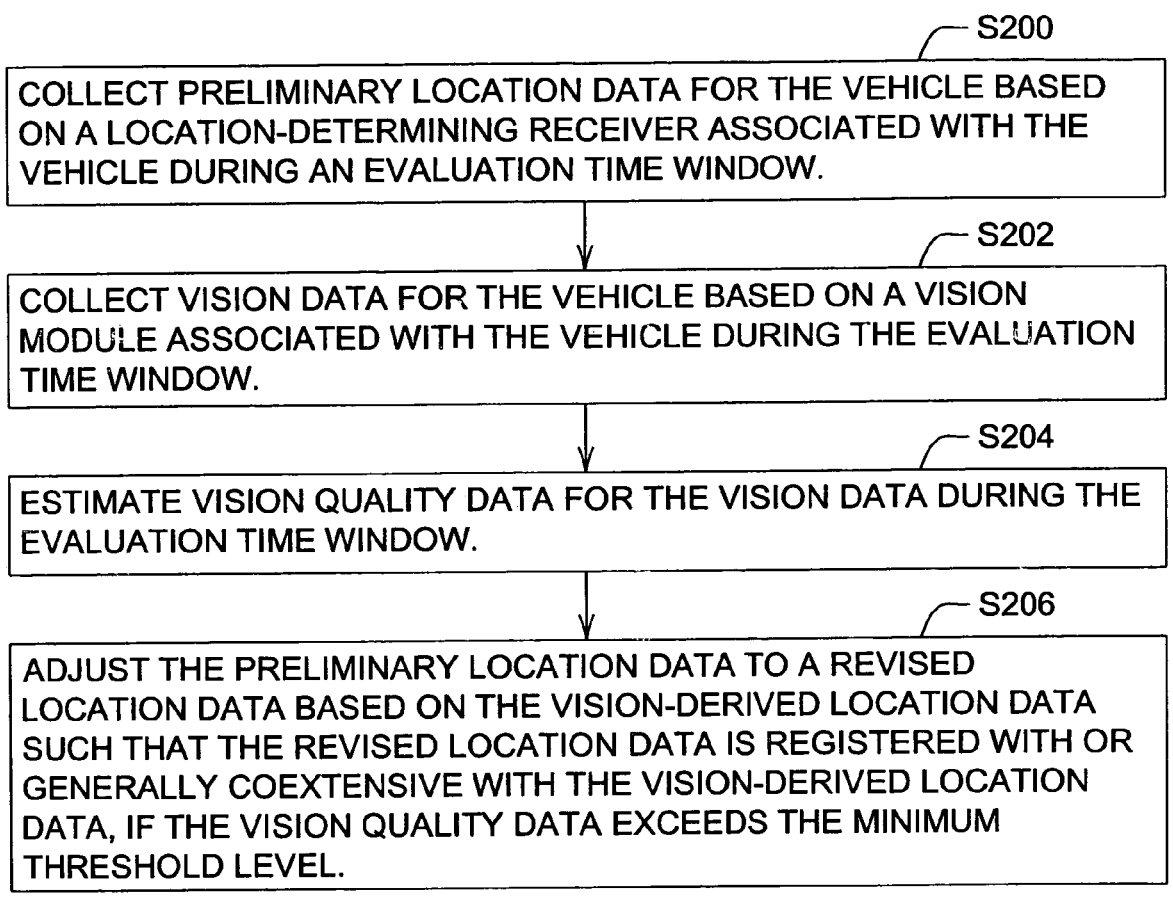
FIG. 2 is a flow chart of a method for guiding a vehicle based on preliminary location data and vision-derived location data in accordance with the invention.

FIG. 2 is a flow chart of a method for guiding a vehicle with a vision-derived location data and location data. The method of FIG. 2 begins in step S200.

In step S200, a location-determining receiver 28 or a location-determining receiver 28 determines preliminary location data for a vehicle associated therewith. For example, the location-determining receiver 28 (e.g., a GPS receiver with differential correction) may be used to determine coordinates of the vehicle for one or more evaluation time intervals or corresponding times. Further, in step S200, the location-determining receiver 28 may determine or derive a location-error signal (e.g., $y_{gps}$) from the location data. The location-error signal may represent a (1) difference between the actual vehicular location and a desired vehicular location for a desired time, (2) a difference between the actual vehicular heading and a desired vehicular heading for a desired time or position, (3) or another expression of error associated with the location data. The location-error signal may be defined, but need not be defined, as vector data.

In step S202, a vision module 22 associated with the vehicle determines vision-derived location data for one or more of said evaluation time intervals or corresponding times. For example, the vision module 22 may collect images and process the collected images to determine vision-derived location data. In one example, the vision-derived location data comprises vision-derived position data of a vehicle, which is obtained by reference to one or more visual reference marker or features with corresponding known locations to determine coordinates of a vehicle. The coordinates of a vehicle may be determined in accordance with a global coordinate system or a local coordinate system. Further, in step S202, the location-determining receiver 28 may determine or derive a vision error signal (e.g., $y_{vision}$) from the location data. The vision error signal represents (1) a difference between the actual vehicular location and a desired vehicular location for a desired time, (2) a difference between the actual vehicular heading and a desired vehicular heading for a desired time or position, (3) or another expression of error associated with the vision-derived location data.

In step S204, a vision quality estimator 20 estimates vision quality data during the evaluation time window. The vision quality estimator 20 may comprise a luminance or photo-detector and a time or clock for time-stamping luminance measurements to determine a quality level based on the ambient lighting conditions. The vision quality estimator 20 may also comprise a measure of confidence or reliability in processing the images to obtain desired features. The confidence or reliability in processing the images may depend upon any of the following factors, among others: technical specification (e.g., resolution) of the vision module 22, reliability of recognizing an object (e.g., landmark in an image), reliability of estimating a location of the recognized object or a point thereon, reliability of converting image coordinates or local coordinates to a global coordinates or vision-derived location data that is spatially and temporally consistent with the location data from the location-determining receiver 28.

Step S204 may be carried out by various techniques which may be applied alternately or cumulatively. Under a first technique, the vision quality estimator 20 may estimate a confidence or reliability in the accuracy of vision-derived location data. Under a second technique, the vision quality estimator 20 first estimates the confidence level, reliability level or another quality level in the accuracy of the vision-derived location data; and, second, the vision quality estimator 20 converts the quality level into a corresponding linguistic value.

In step S206, a adjuster 110 adjusts the preliminary location data to a revised location data based on the vision-derived location data such that the revised location data is registered with or generally coextensive with the vision-derived location data, if the vision quality data exceeds the minimum threshold level. For example, the adjuster 110 may adjust the preliminary location data for any time slot or evaluation time window, where the vision quality data exceeds a minimum threshold level. Registered with or generally coextensive with means that the vision-derived location data and the preliminary location data for the same time interval are generally coextensive or differ by a maximum tolerance (e.g., which may be expressed as a distance, a vector, or separation in seconds (or other units) between geographic coordinates). For example, the maximum tolerance may be set to be a particular distance (e.g., 2.54 centimeters) within a range from one centimeter to 10 centimeters.

In one embodiment, the adjuster 110 transmits or makes available an error control signal to the vehicular controller 25 based on the preliminary location data or revised location data. The revised location data, or the error control signal derived therefrom, may be updated on a time-slot-by-time-slot basis (e.g., during an application time window). Each time slot may be commensurate in scope to the evaluation time interval.

The adjuster 206 may enhance the reliability and accuracy of the revised location data or position information that is provided for navigation or control of the vehicle by using the vision-derived location data of verified quality as a quality benchmark against the preliminary location data. Although the preliminary location data and visional-derived quality data are collected during an evaluation time window; the adjustment of step S206 to the revised location data may be applied during an application time window that lags the evaluation time window or that is substantially coextensive with the evaluation time interval. Regardless of how the evaluation time window and the application time window are defined in this example, in other examples the adjuster 110 may provide predictive control data, feed-forward control data, or feedback control data to the vehicle controller 25.

Figure 3:
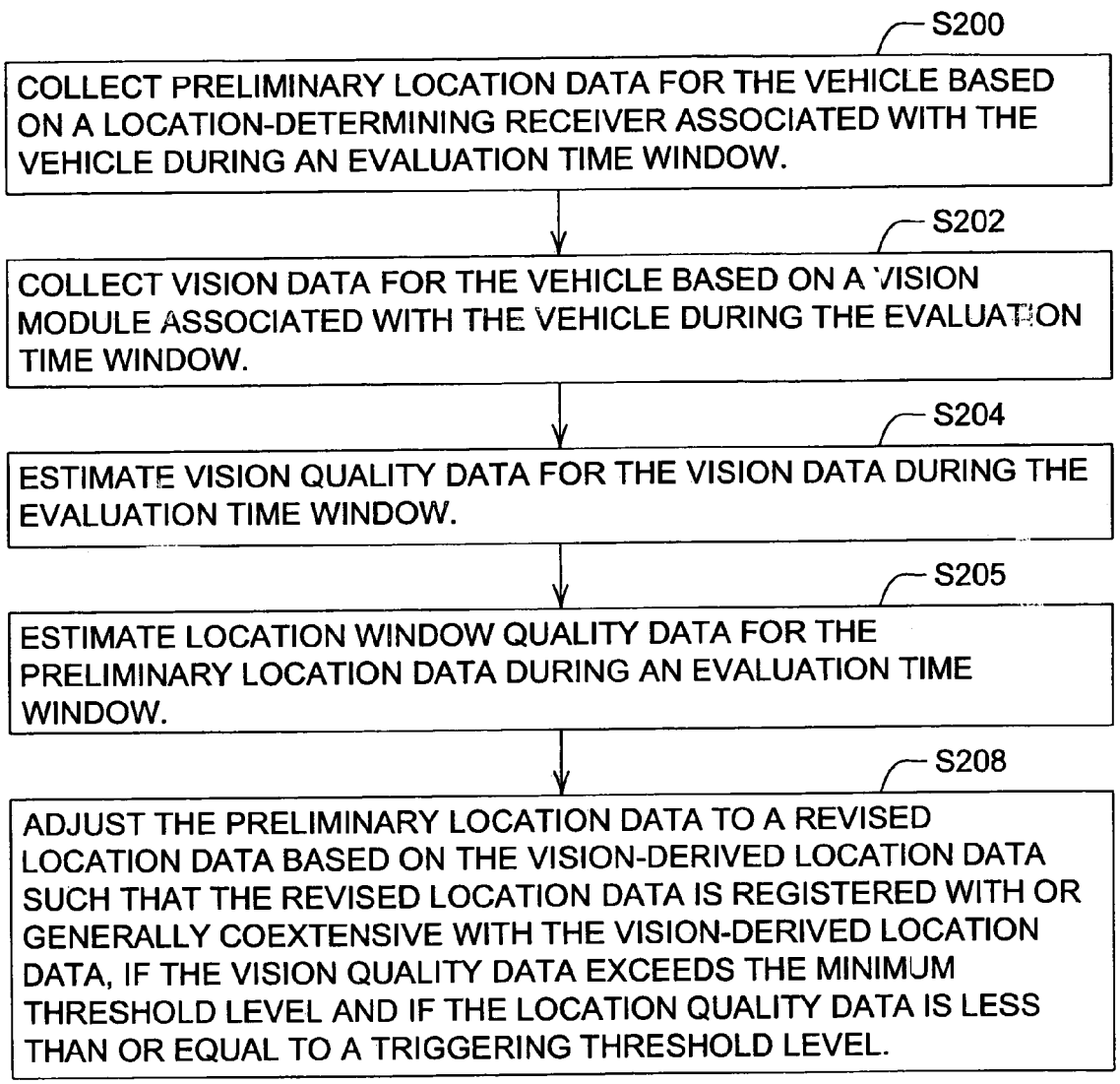
FIG. 3 is a flow chart of another method for guiding a vehicle based on preliminary location data and vision-derived location data in accordance with the invention.

The method of FIG. 3 is similar to the method of FIG. 2, except the method of FIG. 3 includes additional step S205 and replaces step S206 with step S208. Like reference numbers indicate like procedures or steps.

In step S205, a location quality estimator 24 estimates location quality data for the location data during an evaluation time window. Step S205 may be carried out by various techniques which may be applied alternately or cumulatively. Under a first technique, the location quality estimator 24 may estimate or measure signal quality, an error rate (e.g., bit error rate or frame error rate), a signal strength level (e.g., in dBm), or other quality levels. Under a second technique, the location quality estimator 24 first estimates or measures signal quality, an error rate (e.g., bit error rate or frame error rate), a signal strength level (e.g., in dBm), or other quality levels; second, the location quality estimator 24 classifies the signal quality data into ranges, linguistic descriptions, linguistic values, or otherwise.

In step S208, an adjuster 110 adjusts the preliminary location data to a revised location data based on the vision-derived location data such that the revised location data is registered with or generally coextensive with the vision-derived location data, if the vision quality data exceeds the minimum threshold level and if the location quality data is less than or equal to a triggering threshold level. For example, the adjuster 110 may adjust the preliminary location data for any time slot or evaluation time window, where the vision quality data exceeds a minimum threshold level and where the location quality data is less than or equal to a triggering threshold level. For example, he triggering threshold level may be where the reliability or accuracy of the preliminary location data is less than desired because of the lack of availability of satellites, or low received signal quality (e.g., low signal strength) of satellite signals or ancillary transmissions (e.g., terrestrial references) used to determine precision preliminary location data. The adjuster 206 may enhance the reliability and accuracy of the revised location data or position information that is provided for navigation or control of the vehicle by using the vision-derived location data of verified quality as a quality benchmark against the preliminary location data. The method of FIG. 3 makes the adjustment to the revised location data in a more selective manner than FIG. 2, by imposing the additional condition of location data quality falling below a standard (e.g., triggering threshold level).

Figure 4:
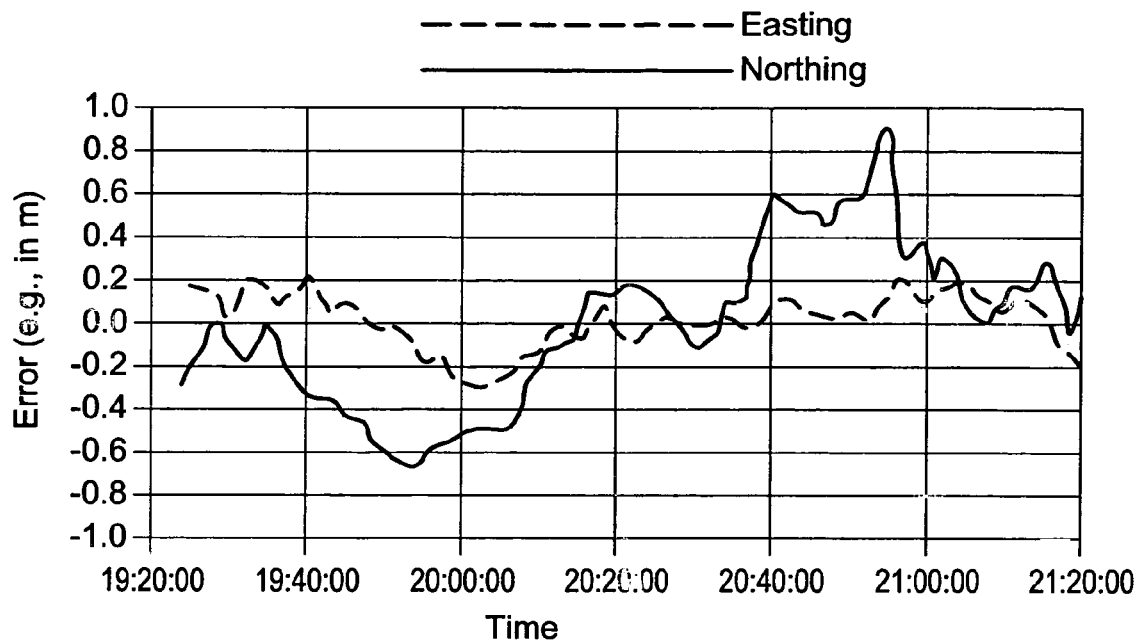
FIG. 4 is a chart that illustrates static positioning error of location data, such as a guidance signal derived from differential Global Positioning System (GPS).

FIG. 4 is a chart that illustrates static positioning error of location data, such as a differential GPS signal. The vertical axis shows error in distance (e.g., meters), whereas the horizontal axis shows time (e.g. seconds).

Figure 5:
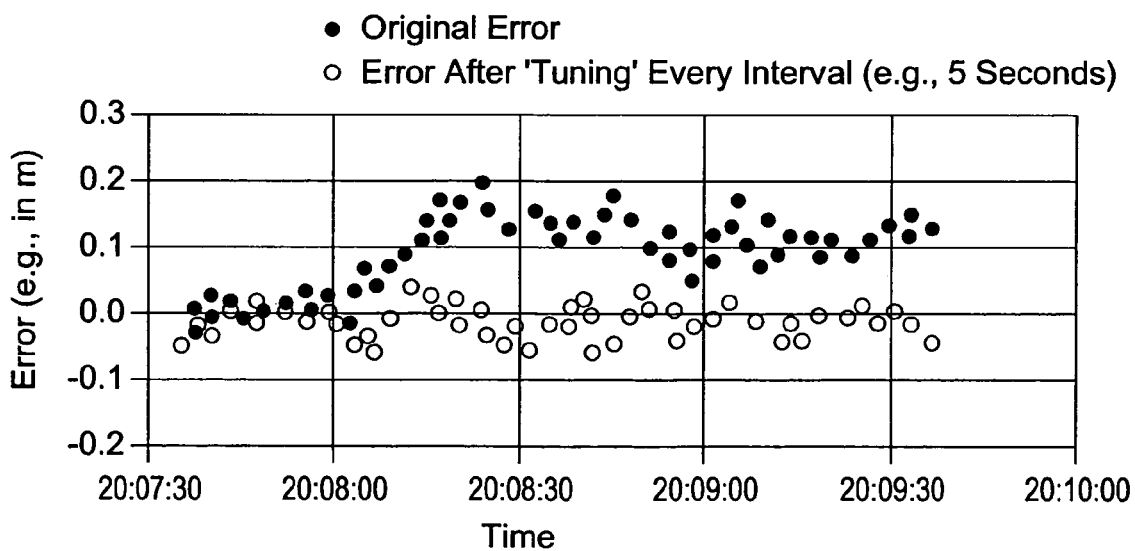
FIG. 5 is a chart that illustrates positioning error of location data, such as a guidance signal derived from differential Global Positioning System (GPS) signal after "tuning" by another sensor, such as a vision module in accordance with the invention.

FIG. 5 is a chart that illustrates dynamic positioning error of location data, such as a differential GPS signal (e.g., location data) after "tuning" at a desired update frequency or rate. The vertical axis shows error in distance (e.g., meters), whereas the horizontal axis shows time (e.g. seconds). FIG. 5 shows the original error without "tuning" as solid circular points and error after "tuning" as circles. The tuning achieved by using the vision-derived location data to adjust the location data at regular intervals (e.g., at 5 second intervals or 0.2 Hz as illustrated in FIG. 5).

Having described the preferred embodiment, it will become apparent that various modifications can be made without departing from the scope of the invention as defined in the accompanying claims.

The invention claimed is:

1. A method for guiding a vehicle, the method comprising:
   collecting preliminary location data for the vehicle based on a location-determining receiver associated with the vehicle during an evaluation time window;
   collecting vision-derived location data for the vehicle based on a vision module associated with the vehicle during the evaluation time window;
   estimating vision quality data for the vision-derived location data during the evaluation time window, the vision quality data based on a corresponding intensity of illumination wherein the vision quality data is based on intensity range versus quality data on a light frequency by light frequency basis; and adjusting the preliminary location data to a revised location data based on the vision-derived location data such that the revised location data is registered with or generally coextensive with the vision-derived location data, if the vision quality data exceeds the minimum threshold level.

2. The method according to claim 1 wherein the adjusting comprises adjusting the preliminary location data if the vision quality data exceeds the minimum threshold level and if the vision-derived location data is substantially the same as the preliminary location data within a defined tolerance.

3. The method according to claim 1 further comprising designating the vision-derived location data as in a good state if the vision quality data corresponding to the vision-derived location data meets or exceeds the minimum threshold level.

4. The method according to claim 1 further comprising determining if the preliminary location data is consistent with a vision-derived location data for the evaluation time window if vision quality data exceeds a minimum threshold level.

5. The method according to claim 1 further comprising repeating the above process for a next evaluation time window of less than or equal to approximately 0.2 seconds.

6. The method according to claim 1 wherein the adjusting is accomplished by providing a revised location data at a frequency of 5 Hertz.

7. The method according to claim 1 wherein the collected vision-derived location data estimates a vehicle location with respect one or more a visual reference landmarks in a field of view, where each visual reference landmark has a known geographic coordinates.

8. The method according to claim 7 wherein the visual reference marker comprises a row of plants.

9. The method according to claim 1 wherein the vision quality data is based on intensity range versus quality data that is applied differently for infra-red range frequencies and for ultra-violet range frequencies than for visible light.

10. The method according to claim 1 wherein the estimating of the vision quality data comprises determining a sum of absolute differences of a mean intensity of each column vector for a hypothesized yaw/pitch pair.

11. A system for guiding a vehicle, the system comprising:
a location module for collecting preliminary location data for the vehicle based on a location-determining receiver associated with the vehicle during an evaluation time window;
a vision module for collecting vision-derived location data for the vehicle based on a vision module associated with the vehicle during the evaluation time window;
a vision quality estimator for estimating vision quality data for the vision-derived location data during the evaluation time window, the vision quality data based on a corresponding intensity of illumination wherein the vision quality data is based on intensity range versus quality data on a light frequency by light frequency basis; and
an adjuster for adjusting the preliminary location data to a revised location data based on the vision-derived location data such that the revised location data is registered with or generally coextensive with the vision-derived location data, if the vision quality data exceeds the minimum threshold level.

12. The system according to claim 11 wherein the adjuster adjusting the preliminary location data if the vision quality data exceeds the minimum threshold level and if the vision-derived location data is substantially the same as the preliminary location data within a defined tolerance.

13. The system according to claim 11 further wherein the vision quality estimator designates the vision-derived location data as in a good state if the vision quality data corresponding to the vision-derived location data meets or exceeds the minimum threshold level.

14. The system according to claim 11 wherein an evaluator determines if the preliminary location data is consistent with a vision-derived location data for the evaluation time window if vision quality data exceeds a minimum threshold level.

15. The system according to claim 11 further comprising repeating the above process for a next evaluation time window of less than or equal to approximately 0.2 seconds.

16. The system according to claim 11 wherein the adjuster adjusts the revised location data at a frequency of 5 Hertz.

17. The system according to claim 11 wherein a vision-derived location data processing module estimates a vehicle location with respect one or more a visual reference landmarks in a field of view, where each visual reference landmark has a known geographic coordinates.

18. The system according to claim 17 wherein the visual reference marker comprises a row of plants.

19. The system according to claim 11 wherein the vision quality estimator comprises an illumination measurement device selected from the group consisting of a photodetector, a photo detector with a frequency selective lens, a group of photo-detectors with corresponding frequency selective lenses, a charged-coupled device, a photometer, and a calcium-sulfide cell.

20. The system according to claim 11 wherein the vision quality data is based on intensity range versus quality data that is applied differently for infra-red range frequencies and for ultra-violet range frequencies than for visible light.

* * * * *